March 30, 1926.                    1,578,561
A. STEINMANN
SHOCK ABSORBER
Filed July 11, 1923
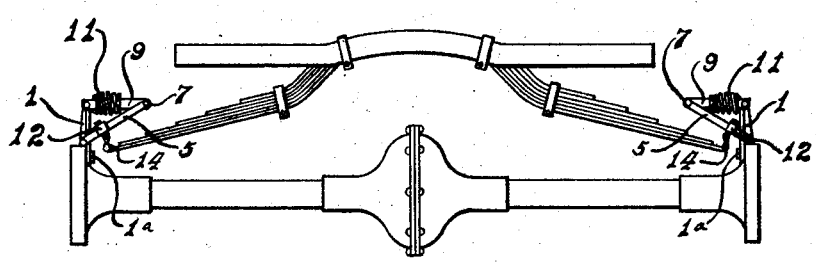
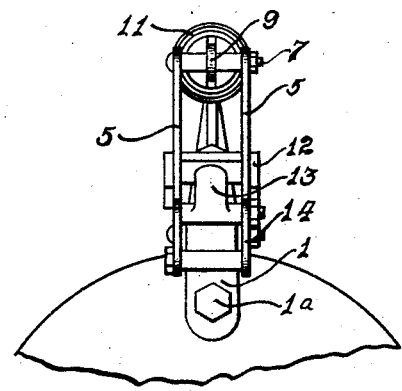 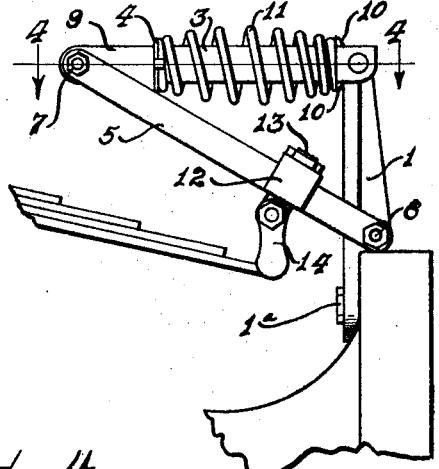
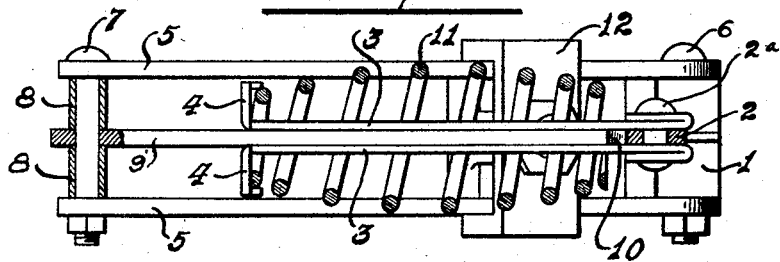
WITNESSES
M. Clifford
Fred E. Kaesler
INVENTOR
August Steinmann
by Charles W. Hills
Attys Patented Mar. 30, 1926.

1,578,561

UNITED STATES PATENT OFFICE.

AUGUST STEINMANN, OF CHICAGO, ILLINOIS, ASSIGNOR TO ANDREW CHRIST, JR., OF CHICAGO, ILLINOIS.

SHOCK ABSORBER.

Application filed July 11, 1923. Serial No. 650,763.

*To all whom it may concern:*

Be it known that I, AUGUST STEINMANN, a citizen of the United States, and a resident of the city of Chicago, in the county of Cook and State of Illinois, have invented certain new and useful Improvements in a Shock Absorber; and I hereby declare that the following is a full, clear, and exact description of the same, reference being had to the accompanying drawings, and to the numerals of reference marked thereon, which form a part of this specification.

This invention relates to a shock absorber for automobiles and consists of a simple structure that can readily be applied to certain types of motor cars without drilling any extra bolt holes or altering any standard construction. It is also contemplated to utilize the removable T-bolts for the springs and incorporate the same in the shock absorber for performing a similar function.

The invention comprises the novel structure and combination of parts hereinafter described and more particularly pointed out and defined in the appended claim.

In the accompanying drawings, which illustrate a preferred embodiment of this invention and in which similar reference numerals refer to similar parts in the different views:

Figure 1 is an elevational view of the rear axle casing of a Ford car showing my shock absorber applied thereto.

Figure 2 is an enlarged elevational view of the shock absorber with a portion of the vehicle spring attached thereto.

Figure 3 is a front elevational view of the shock absorber.

Figure 4 is an enlarged sectional view taken substantially upon the line 4—4 of Figure 2.

In referring now to the drawings, there is illustrated a vertical standard 1 having a bolt hole at its lower end which is adapted to receive a bolt $1^a$ extending through the usual hole in the side of the axle casing in which the spring suspension T-bolt is normally secured. The upper end of the standard 1 is provided with a flat inwardly directed apertured lug 2. A pair of parallel metal strips 3 are pivoted at their outer ends upon opposite sides of the lug 2 by a pivot bolt $2^a$, the inner ends of said strips having integral abutments 4 extending at right angles thereto.

A pair of parallel bars 5 are pivoted at one end to the lower portion of the standard 1 by means of a common pivot 6. The other ends of these bars are connected by a bolt 7 having a pair of spacing sleeves 8. A flat bar 9 is pivoted between the sleeves 8 upon the bolt 7 and extends between the parallel flat bars 3. The free end of the bar 9 is provided with oppositely extending lugs 10. A coil spring 11 surrounds the bars 3 and 9 with its ends respectively abutting the abutments 4 and lugs 10. Besides its ordinary function of absorbing the shock the spring 11 also holds the bars 3 and 9 in parallel and telescopic relation.

A U shaped clip 12 is welded or secured in some appropriate manner over the bars 5; the arms of the clip being attached to the bars and the connecting web of the arms bridging the space between the bars. A bolt aperture is made centrally of the web, and a T-shaped bolt 13 is secured by a nut, and depends therefrom and the stirrup 14 of the vehicle springs is attached thereto. This T-shaped bolt 13 is exactly like the one now in use upon Ford cars, so that in applying the shock absorber, the T-shaped bolt on the car may be utilized.

Shock absorbers of the type just described may be quickly and easily applied to automobiles and vehicles. When it is desired to apply the same to a Ford car or the like, it is only necessary to remove the two T-shaped bolts that connect the spring to the axle casing. My shock absorbers may then be attached by means of bolts $1^a$ extending through the holes left vacant by the T-shaped bolts. The removed T-shaped bolts on the ends of the spring may then be secured to the U-shaped clips 12 as before explained whereby the vehicle springs become suspended upon the shock absorbers as shown in Figure 1.

In operation any jolt or jar of the vehicle will swing the pivot points defined by the bolt 7 downwardly. This action will increase the distance between the pivots $2^a$ and 7 and compress the springs 11 for absorbing the shock; the expansible and contractable feature of the telescopic bars 3 and 9 permitting such action.

From the foregoing, it will be apparent that a very simple and durable shock absorber has been provided that may be readily applied without any change and alterations to existing automobiles.

I am aware that many changes may be made, and numerous details of construction may be varied through a wide range without departing from the principles of this invention, and I therefore do not purpose limiting the patent granted hereon, otherwise than necessitated by the prior art.

I claim:

In a shock absorber, a vertical standard, an inclined bar pivoted at its lower end to the lower portion of said standard, horizontally disposed bars connected respectively with the upper ends of said standard and inclined bar and in telescopic relation as to each other, and a spring encircling said latter bars and adapted to exert a compression resistance against downward movement of the vehicle body.

In testimony whereof I have hereunto subscribed my name.

AUGUST STEINMANN.